April 2, 1957  H. R. KARP ET AL  2,787,696
METHOD OF HEATING A WINDSHIELD TO REMOVE
AND PREVENT ICE ACCUMULATIONS
Original Filed June 17, 1949

INVENTORS
HARRY R. KARP
ALLEN W. BLANCHARD
BY Herbert L. Davis
ATTORNEY

United States Patent Office 2,787,696
Patented Apr. 2, 1957

2,787,696

METHOD OF HEATING A WINDSHIELD TO REMOVE AND PREVENT ICE ACCUMULATIONS

Harry R. Karp, Hillside, and Allen W. Blanchard, Allendale, N. J., assignors to Bendix Aviation Corporation, Teterboro, N. J., a corporation of Delaware Original application June 17, 1949, Serial No. 99,764, now Patent No. 2,616,018, dated October 28, 1952. Divided and this application March 1, 1952, Serial No. 274,484

3 Claims. (Cl. 219—20)

The present application is a division of U. S. application Serial No. 99,764, filed June 17, 1949, by Harry R. Karp and Allen W. Blanchard and now U. S. Patent No. 2,616,018, granted October 28, 1952, and assigned to Bendix Aviation Corporation. The present application relates to a novel method of applying heat to a transparent panel and more particularly to a novel method for controlling the application of heat to the windshield of an aircraft to effect the removal and prevention of the accumulation of ice thereon.

An object of the invention is to provide a novel method for controlling the application of heat to the windshield of an aircraft so as to limit the rate of change of temperature to a safe value so as to avoid thermal shock or other damage caused by a too rapid change of temperature when the temperature of the windshield is below a predetermined safe value, while providing a desirable and more rapid rate of temperature change when the temperature of the windshield is above the predetermined critical safe value.

The above and other objects and features of the invention will appear more fully hereinafter from a consideration of the following description taken in connection with the accompanying drawings wherein one structure for carrying out the novel method of the invention is illustrated by way of example.

Figure 1:
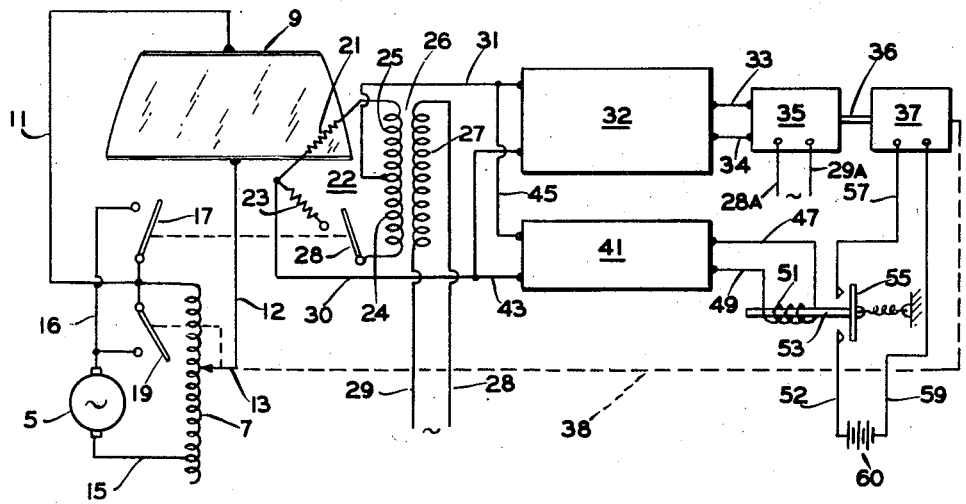
Figure 1 is a schematic diagram of a control system for a heater of a transparent panel or windshield.

Referring to the drawing of Figure 1, there is illustrated a control system for a windshield heater claimed broadly in copending application Serial No. 68,594, filed December 31, 1948, by Joel D. Peterson and specifically disclosed and claimed in the aforenoted parent application Serial No. 99,764, filed June 17, 1949, by Harry R. Karp and Allen W. Blanchard and now U. S. Patent No. 2,616,018, granted October 28, 1952, and assigned to Bendix Aviation Corporation. The control system includes an alternator 5 of suitable type and which may be driven by an aircraft engine as a source of power, and a variable transformer 7 which is arranged to modify the output voltage applied by the alternator 5 to a heater 9 of a windshield or transparent panel.

The heater 9 of the windshield may be transparent electrical conductive coating applied to the windshield of a type such as sold under the trade-names NESA and Electra-Pane. The heater 9 is connected by conductors 11 and 12 to the output of the transformer 7. The conductor 12 is connected to a movable arm 13 of the transformer 7. The transformer 7 is connected by conductors 15 and 16 to the output of the alternator 5. The conductor 16 is controlled by on-off switch 17 and limit switch 19 connected in parallel.

A temperature sensing element 21 is embedded in the windshield and comprises a resistance having a high temperature coefficient, such as tungsten, and is used as a master to determine the amount and rate of application of heat to the windshield. The temperature element 21 may be of such a type as described and claimed in copending application Serial No. 151,009, filed March 21, 1950, by Joel D. Peterson as a division of the application Serial No. 68,594, filed December 31, 1948.

The temperature element 21 forms one arm of an alternating current excited bridge 22. A non-thermal sensitive reference resistor 23 serves as another leg of the bridge 22, and the remaining legs are provided by windings 24 and 25 forming the secondary of transformer 26. The bridge circuit is supplied within alternating current by primary winding 27 of the transformer 26 inductively coupled to the secondary windings 24 and 25. The winding 27 is connected to a suitable source of alternating current. The resistor 23 is of a value such as to balance the bridge when the control temperature, say for example, 120° F. is reached. The output of the bridge will be directional or phased, depending upon whether the resistance of the element 21 is above or below the reference resistor 23 which is connected into the bridge by an on-off switch 28 mechanically connected to switch 17. The output voltage of the bridge 22 is connected by conductors 30 and 31 to the input of a phase-sensitive detector and amplifier 32.

The output of the amplifier 32 is connected by conductors 33 and 34 to one phase winding of a reversible motor 35, which may be of the two-phase type; and the other phase winding being connected by conductors 28A and 29A across the source of alternating current for operation of the motor 35 in a manner well known in the art. The output shaft 36 of the motor 35 is mechanically connected to deliver torque to a gear train 37. The gear train 37 is of the two speed type having a ratio changing system and solenoid control clutch for selecting output speeds of rotation of N or N/10, the operation of which will be explained.

The output of the gear train 37 is mechanically connected by a shaft 38 to rotate the movable arm 13 of the variable transformer 7 to provide an output voltage dependent upon the position of the movable arm. The input voltage of the transformer 7 will be the output voltage of the alternator 5. Thus, when the value of resistor 21 is below that of the resistor 23, the bridge 22 will be unbalanced in a direction to energize the reversible motor 35 so as to drive the movable arm 13 of the transformer 7 in a direction to increase the voltage applied to the windshield 9. When the value of the resistor 21 is above that of the resistor 23, the bridge 22 will be unbalanced in the opposite direction to energize the motor 35 so as to drive the movable arm 13 of the transformer 7 in a direction to decrease the voltage applied to the windshield 9. Upon the values of the resistors 21 and 23 being equal the bridge will be balanced, hence the motor 35 will not be energized and as long as the temperature of the windshield remains constant, the voltage supplied thereto will be constant. As the temperature changes the control system will continuously adjust itself to maintain a constant preselected temperature at the windshield or transparent panel 9 regardless of changes in outside air temperature or heat transfer conditions.

*Novel method of windshield heater control*

In order to avoid thermal shock or other damage caused by a too rapid change in temperature, the novel method herein described and claimed limits the rate of change to a safe value when the temperature of the windshield or transparent panel 9 is below a predetermined value, say for example 100° F. However, when the temperature of the windshield 9 reaches the predetermined temperature, a fast reaction to temperature changes due to changes in outside air temperature, aircraft speed, and heat transfer conditions is desirable and is provided under the present method.

In the system disclosed herein, the method is carried out by means of the two-speed gear train 37 in which two operating speeds are automatically obtained. The gear train 37 is mechanically connected to be operated through a solenoid controlled clutch as will be explained hereinafter with reference to Figures 2 and 3. Control for the solenoid is provided by an auxiliary circuit 41 connected by conductors 43 and 45 across the output of the bridge 22. The auxiliary circuit 41 may, for example, be an amplifier circuit so arranged as to have energy flowing in its output circuit when the temperature of the windshield 9 is below a predetermined value of, for example, 100° F. A pilot relay winding 51 is connected by conductors 47 and 49 across the output of the circuit 41. The relay winding 51 controls an armature element 53 arranged to close switch contacts 55 upon the winding 51 being energized. Closing the switch contacts 55 energizes the solenoid of the two-speed clutch 37 through conductors 57 and 59 from a source of D. C. electrical energy 60.

Upon energization, the solenoid actuates the clutch and thereby the gear train 37 to its N gear ratio where it will be maintained as long as the control solenoid is energized. When the gear train 37 is in this position, the movable arm 13 of the transformer 7 will be rotated slowly giving a slow rate of temperature rise.

Upon the temperature of the windshield 9 reaching 100° F., the auxiliary circuit 41 will cause relay winding 51 to release the armature 53 under spring tension and return the switch contacts 55 to an open position de-energizing the control solenoid of the gear train 37 and return the gear train 37 to its normal N/10 ratio. In this latter position the movable arm 13 will be rotated at a faster rate thus providing fast action to give good response in the region of the control temperature.

Figure 2:
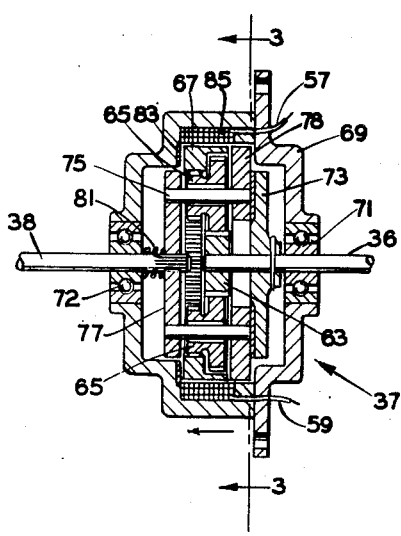
Figure 2 is a cross-sectional view of a solenoid operated clutch.
Figure 3:
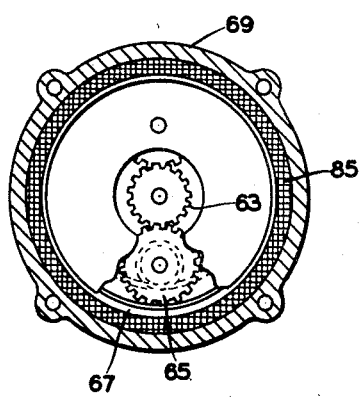
Figure 3 is a sectional view of the clutch of Figure 2 taken along the line 3—3 thereof.

The solenoid controlled clutch gear train 37 may be the clutch and gear train assembly illustrated by Figures 2 and 3 and disclosed and claimed in application Serial No. 99,765, filed June 17, 1949, by Harry R. Karp and Philip J. Guillot and now U. S. Patent No. 2,616,019, granted October 28, 1952, and assigned to Bendix Aviation Corporation.

Secured to the input shaft 36 of the gear train 37 is a sun gear 63 which meshes with planet gears 65, which in turn mesh with orbit gear 67. The input shaft 36 is rotatably supported in housing 69 by bearing 71. Securely attached to the shaft 61 is a clutch plate 73. The planet gears 65 are supported on shafts 75 carried by spiders 77 and 78. The spider 77 is splined to output shaft 38 which is rotatably supported in the housing 69 by a bearing 72. A compression spring 81 bears against the spider 77. Adjacent to the orbit gear 67 on the housing 69 is a clutch facing 83. A solenoid winding 85 is arranged around the inner circumference of the housing 69. The winding 85 is connected through switch 55 to the source of direct current 60 by the conductors 57 and 59. The orbit gear 67 and spider 78 serve as the armature of the solenoid.

In operation, when the solenoid winding 85 is de-energized as shown in Figure 2, the spider 78 is held in intimate contact with the clutch plate 73 by the pressure of the spring 81. This locks the planetary system and permits it to rotate with the shaft 36. When the solenoid winding 85 is energized, the pressure of the spring 81 is overcome and the spider 78 is moved out of contact with clutch plate 73 and the orbit gear 67 is biased by the solenoid 85 into intimate contact with the clutch facing 83, whereupon the shaft 38 is driven through the planetary gear system.

When the pilot determines that heat will be needed at the windshield 9, he may manually actuate the switch 17 to the "on" position and close switch 28 in the bridge circuit 22 so as to place the bridge circuit 22 in an operative condition sensitive to temperature changes. The unbalance in the bridge circuit 23 causes the solenoid 85 to actuate the gear train 37 to the N ratio. The movable arm 13 of the variable transformer operated by shaft 38 begins to rotate slowly increasing the voltage applied to the windshield 9. As the movable arm 13 moves away from its low voltage position, the limit switch 19 operated by the arm 13 automatically returns to its normally closed position.

When the temperature of the windshield 9 reaches 100° F. the auxiliary circuit 41 opens the switch 55 and the solenoid 85 becomes de-energized. Spring means 81 actuate the gear train 37 to its N/10 ratio so that the arm 13 driven by shaft 38 rotates faster until the temperature is 120° F. As the temperature varies from 120° F., an unbalanced voltage appears at the output of the bridge 22 of such a phase as to cause the motor 35 to drive the arm 13 in such a direction as to increase (or decrease) the energy supplied and thus maintain 120° F. at the windshield 9.

To shut off the system, the switch 17 is actuated to its "off" position. This also opens the interconnected switch 28 in the bridge circuit 22 introducing a large unbalanced voltage in the system of such a phase as to cause motor 35 to drive the arm 13 to a low voltage position. This unbalanced voltage also causes the auxiliary circuit 41 to energize the solenoid 51 and close switch 55 to energize solenoid 85 which actuates the gear train 37 to its N ratio thereby rotating the arm 13 at a slow rate, thus limiting the rate of decrease of temperature.

Upon the arm 13 reaching its minimum voltage position, it will automatically operate the limit switch 19 to cut off all power to the system. The system will then be in the proper position when it is recycled.

The automatic temperature control system limits the rate of change of temperature to a safe value and also continuously adjusts itself to maintain a constant preselected temperature at the windshield regardless of changes in outside air temperature or heat transfer conditions. The only manual control required is the "on-off" switch 17—28, all other controls being automatic dependent upon conditions in the system.

Although only one structure for carrying out the novel method of the present invention has been illustrated and described, various other structures and changes in the form and relative arrangements of the parts of such structure may be made to carry out the novel method of the present invention.

What is claimed is:

1. A method for preventing accumulation of ice upon a surface of a transparent panel of an aircraft, comprising the steps first of applying heat to such surface, second increasing the heat applied to such surface at a relatively slow rate so long as the temperature of the panel is below a predetermined range so as to prevent thermal shock, and third increasing the heat applied to such surface at a more rapid rate upon the panel temperature being within the predetermined range and until the temperature of the panel reaches a predetermined value.

2. The method defined by claim 1 including the further step of decreasing the heat applied to such surface at said rapid rate upon the panel temperature exceeding said predetermined value so as to regulate the temperature of said panel to said predetermined value.

3. A method for preventing accumulation of ice upon a surface of a transparent panel of an aircraft exposed to ice forming conditions, comprising the steps first of sensing the temperature of said panel, second applying heat to such surface and increasing the heat applied to such surface at a relatively slow rate so long as the sensed panel temperature is below a predetermined safe range so as to prevent damage to the transparent panel by thermal shock, third increasing the heat applied to such surface at a more rapid rate upon the sensed panel temperature being within the predetermined safe range and until the temperature of the panel reaches a predetermined value, and fourth decreasing the heat applied to such surface at said rapid rate upon the sensed panel temperature exceeding said predetermined value so as to regulate the temperature of said panel to said predetermined value.

References Cited in the file of this patent

UNITED STATES PATENTS

| | | |
|---|---|---|
| 1,942,587 | Whitman | Jan. 9, 1934 |
| 2,025,134 | Stammberger | Dec. 24, 1935 |
| 2,026,165 | Goodwillie | Dec. 31, 1935 |
| 2,105,598 | Hubbard | Jan. 18, 1938 |
| 2,389,360 | Guyer et al. | Nov. 20, 1945 |
| 2,462,207 | Mershon | Feb. 22, 1949 |
| 2,488,422 | Mershon | Nov. 15, 1949 |
| 2,530,980 | Mershon | Nov. 21, 1950 |
| 2,557,905 | Burton et al. | June 19, 1951 |
| 2,600,313 | Mershon | June 10, 1952 |
| 2,608,635 | Mershon | Aug. 26, 1952 |
| 2,616,018 | Karp et al. | Oct. 28, 1952 |
| 2,616,019 | Guillot et al. | Oct. 28, 1952 |